US010430300B2

(12) United States Patent
Vasantha et al.

(10) Patent No.: US 10,430,300 B2
(45) Date of Patent: Oct. 1, 2019

(54) PREDICTIVE ANALYSIS, SCHEDULING AND OBSERVATION SYSTEM FOR USE WITH LOADING MULTIPLE FILES

(71) Applicant: Bank of America Corporation, Charlotte, NC (US)

(72) Inventors: Sireesh Kumar Vasantha, Andhra Pradesh (IN); Suki Ramasamy, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 225 days.

(21) Appl. No.: 15/613,446

(22) Filed: Jun. 5, 2017

(65) Prior Publication Data
US 2018/0349232 A1    Dec. 6, 2018

(51) Int. Cl.
*G06F 11/00*    (2006.01)
*G06F 11/14*    (2006.01)
*G06N 20/00*    (2019.01)

(52) U.S. Cl.
CPC ...... *G06F 11/1492* (2013.01); *G06F 11/1402* (2013.01); *G06N 20/00* (2019.01)

(58) Field of Classification Search
CPC ............. G06F 11/1479; G06F 11/1492; G06F 11/1402; H04L 47/80
See application file for complete search history.

(56) References Cited

U.S. PATENT DOCUMENTS

| 5,355,475 | A | * | 10/1994 | Tanaka ................. G06F 3/0601 |
| | | | | 707/829 |
| 5,881,283 | A | | 3/1999 | Hondou et al. |
| 7,386,586 | B1 | | 6/2008 | Headley et al. |
| 7,788,638 | B2 | | 8/2010 | Hoberman et al. |
| 8,020,161 | B2 | | 9/2011 | Markov |
| 9,430,288 | B2 | | 8/2016 | Wilson et al. |
| 9,465,653 | B2 | | 10/2016 | Kishore et al. |
| 9,519,887 | B2 | | 12/2016 | Hennessy et al. |

(Continued)

OTHER PUBLICATIONS

"What are the Differences Between Crontab and AutoSYS?", https://www.quora.com/What-are-the-differences-between-Crontab-and-AutoSYS, Jan. 31, 2017

(Continued)

*Primary Examiner* — Philip Guyton
(74) *Attorney, Agent, or Firm* — Weiss & Arons LLP; Michael A. Springs, Esq.

(57) ABSTRACT

A method for creating a common platform graphical user interface is provided. The interface may enable a user to trigger a data load job from a tool. The tool may monitor file upload events, trigger jobs and identify lists of missing or problematic file names. The tool may run on a single thread, thereby consuming relatively less system resources than a multi-thread program to perform its capabilities. The tool may enable selection of file names using wildcard variables or keyword variables. The tool may validate a list of files received against a master file list for each data load job. The tool may receive user input relating to each data load job. The tool may generate a loop within the single thread to receive information. The tool may analyze the received information and use the received information to predict future metadata associated with future data load jobs.

1 Claim, 4 Drawing Sheets

(56) References Cited

U.S. PATENT DOCUMENTS

2002/0120741 A1* 8/2002 Webb .................. G06F 11/3093
                                                    709/225
2011/0131322 A1* 6/2011 Aust .................. H04L 67/1097
                                                    709/224

OTHER PUBLICATIONS

"AutoSYS—A Job Scheduling Tool," http://www.dbaref.com/autosys-jobs, Feb. 11, 2012.
"Linux Crontab Command," https://www.computerhope.com/unix/ucrontab.htm, Apr. 26, 2017.

* cited by examiner

User Interface
- Multi-file option
- Project name
- File keywords/wildcard/names
- File observation event
- Email list
- Observation Date/time/duration
- Locationdetails
- File Freq
- Job to be triggered (optional)

Bulk Inputs
- Observation details in csv file

FIG. 2

PREDICTIVE ANALYSIS, SCHEDULING AND OBSERVATION SYSTEM FOR USE WITH LOADING MULTIPLE FILES

FIELD OF TECHNOLOGY

This invention relates to monitoring file loading. Specifically, this invention relates to dynamic scheduling and simplifying of loading multiple files.

BACKGROUND OF THE DISCLOSURE

Conventionally, a server may receive many files from various entities. The server may be required to execute or perform actions on the files. The actions may include loading the files, copying the files, manipulating the files, executing the files and/or any other sort of action.

The files may be received on a schedule. At times, the files may arrive prior to scheduled arrival, on schedule, or after scheduled arrival.

In jobs that include file or data loading, there may be a need for a job to be triggered when a file arrives in a file or data landing zone. When the file arrives in a specified area or landing zone, an underlying system may utilize the file as input and process, or load the file. The execution of data or file load jobs may be triggered by scheduler tools such as Cron tab, Autosys or any other suitable scheduler tools. The scheduler tools enable the creation of a watcher script to recognize the incoming files.

There are numerous problems associated with creating watcher scripts within a scheduler tool. A first problem may be that, if a data load job requires multiple files as input, there may be a need to create multiple watcher scripts (each watcher script corresponding to a single file) in the scheduler tool. At times, there may be tens or hundreds of files per job at it may be time consuming and tedious to create multiple watcher scripts, maintain the scripts and analyze the scripts when there is an issue (such as, in a debugging scenario) for each of the files.

A second problem may be that, using the existing scheduler tools, a user is not informed about the historical information pertaining to previous file observation. The user or the system, therefore, cannot use the historical information to make educated predictions, in the future, relating to similar files.

A third problem may be when there is an issue, or input files are not available in the landing area or specified area, the scheduler tools may present an alarm. The alarm is typically a general alert that there is an issue but there is no specific point to remedy. Therefore, a user may be required to debug the entire script and/or file to attempt to remedy the issue point.

A fourth problem may be that multiple scripts may initiate multiple threads in the operating system and therefore, may occupy a large amount of system resources.

A fifth problem may be that the scheduler tools do not have the capability to validate a list of files against the files that have arrived and/or the files that have been loaded.

A sixth problem may be that the existing scheduler tools may not capture names for each file and therefore, it may be difficult to identify the root cause or root system that sent and incorrect file.

A seventh problem may be that the existing scheduler tools may be unable to validate calendar events relating to particular files.

As the amount of files and data being loaded multiplies, it becomes more and more difficult to maintain a system that includes the aforementioned problems. Furthermore, the inconsistency in file arrival may cause bottle necks at the server.

Therefore, performing predictive analysis on files that are scheduled to arrive may be desirable. Also, scheduling arrival times of files based on the predictive analysis may be desirable. Additionally, observing the actual arrival times of the files may be desirable. A system that combines performing predictive analysis, scheduling arrival times of files and observing actual arrival times of files may be further desirable. It would be yet further desirable to use this system in connection with loading multiple files.

SUMMARY OF THE INVENTION

A common platform and/or graphical user interface may be provided. The platform may be built on Shell script or Power shell script. Shell script or Power shell script may allow a user or developer to trigger data load jobs from a single observation tool. The tool may monitor the file arrival and its characteristics in a specified location; and trigger the data loading jobs which are dependent on the files.

The tool may run a single thread, thereby consuming less system resources to monitor multiple file events, trigger the required jobs and identify a list of missing or problematic file names. The tool may enable easy selection of file names using wildcard or keywords for observation. The tool may also validate files to be observed against the master file list for each project. The tool may authenticate the user and the user's requests. The tool may receive user input such as, file names, alarm emails, date, time and duration of observation, location, etc. Based on the inputs, the tools may generate multiple observation loops within a single thread. During each observation loop the tool may observe the file event or presence during the specified duration for each observation loop. Based on the event, each loop may generate the status code. The status code may include dependent data load jobs that may be triggered. The tool may also gather a list of file names that are missing or problematic from each loop.

The tool may collect historic information relating to file events. The tool may analyze historical event that included failures to specific threshold limits. The tool may generate an alert relating to the failures. The tool may also intelligently suggest to the user, based on the historical information, which values to enter into an observation duration window.

An apparatus for monitoring loading of multiple files is also provided. The apparatus may include a server. The server may include a receiver. The receiver may be configured to receive a plurality of files. Each of the files may be associated with a specific task.

The server may include an observing engine. The observing engine may be configured to analyze the files. The analysis may include deriving and/or otherwise determining the size and type of the files. The analysis may include deriving a timestamp reflecting the arrival time of each of the files at the server. Information yielded by the analysis may be labeled, for the purposes of this application, derived information.

The server may include a comparison engine. The comparison engine may be configured to compare the derived information with expected or anticipated information. The expected or anticipated information may correspond to information assigned to the files prior to receipt thereof.

The server may include a processor. The processor may be configured to use the comparison to create a profile for each of the plurality of files.

The profile may include the source of the file. The profile may include an entity associated with the file. The profile may include historic behavior or performance information associated with the file.

In some embodiments, the profile may be transmitted to respective stakeholders. The profile may include suggestions for remediating any issues or problems, such as, for example, a file that habitually arrives ten minutes prior to its scheduled time of arrival.

The server may include a prediction engine. The prediction engine may be configured to use the profile to predict a future timestamp. The future timestamp may correspond to when an expected file is expected to arrive at the server. The expected file may be included in a plurality of expected files. The prediction engine may consider the historic behavior and/or performance information, included in the profile, when determining a future timestamp.

In some embodiments, a file may be included in a project. A project may be a group of files. The group of files may be loaded to the server together or simultaneously. The group of files may also be loaded to the same or similar locations. The files within a project may be interdependent and, as such, need each other in order to operate properly.

The prediction may be based on a profile of a project. The profile of the project may include the expected file. The profile of the project may include information relating to the arrival times of the files included in the project.

The prediction may be based on a profile of a previously received file. The previously received file may share a predetermined number of characteristics with the expected file.

The server may use the prediction information to prepare to be available for the expected file at or about the future timestamp. The preparations may include allocating a portion of memory to be available at the future timestamp. The portion of memory may be available for the observation thread. The portion of memory may be available for the expected file. The preparations may also include allocating a plurality of processor cycles to be available at the future timestamp. The allocated processor cycles may be available for the observation thread. The allocated processor cycles may be available for the expected file. The server may load the expected file to the allocated portion of memory using the allocated processor cycles at the future timestamp.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 2 shows an illustrative diagram in accordance with principles of the invention;

DETAILED DESCRIPTION OF THE DISCLOSURE

Figure 1:
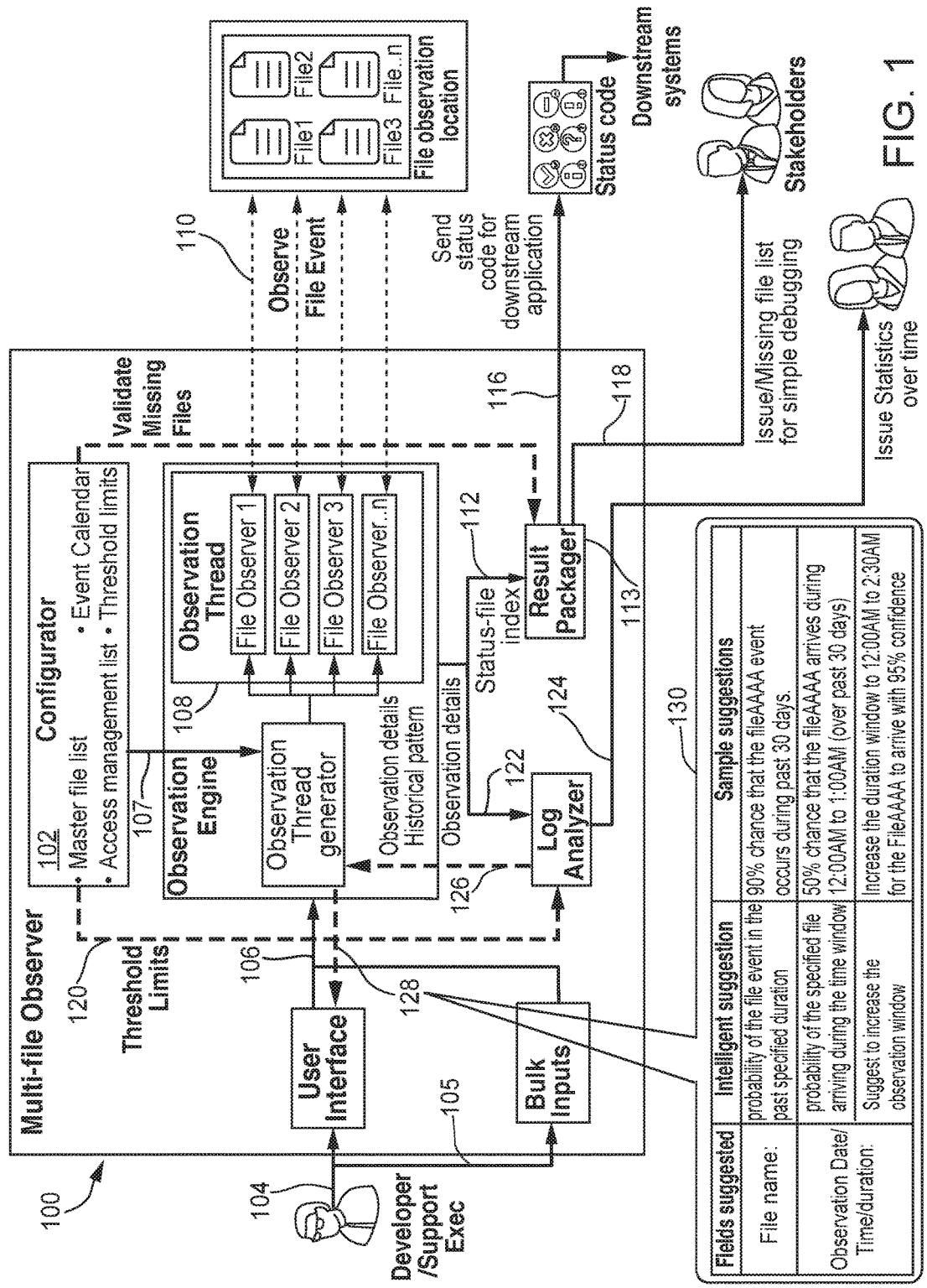
FIG. 1 shows an illustrative hybrid diagram/flow chart in accordance with principles of the invention.

Apparatus and methods for monitoring loading of multiple files is provided. The method may include receiving a plurality of files at a server. Each of the received files may be associated with a specific task. The method may also include analyzing each file included in the plurality of files.

The analysis may include deriving and/or otherwise determining the size and type of each file. The analysis may include deriving a timestamp reflecting the arrival time of each of the files at a server.

The method may include comparing derived information with expected or anticipated information. The derived information may include the size and type of each of the plurality of files. The derived information may include the timestamp reflecting the arrival time of each of the plurality of files. The expected or anticipated information may correspond to information assigned to the files prior to receipt thereof. In some embodiments, the expected or anticipated information may be user-inputted. The method may include using the comparison to create a profile for each of the plurality of files.

The profile may include the source of the file. The profile may include an entity or sub-entity associated with the file. The method may include predicting a future timestamp using the profile. The future timestamp may indicate when an expected file is expected to arrive at the server. The expected file may be included in a plurality of expected files. The plurality of expected files may be considered, for the purposes of this application, a project.

The predicting may be based on a profile of a project. The project may include the expected file.

The predicting may be based on a profile of a previously-received file that shares a predetermined number of characteristics with the expected file. The characteristics may include file name, project name, entity name, file size and any other suitable characteristics.

The method may include allocating a portion of memory to be available at the future timestamp. The method may also include allocating a plurality of processor cycles to be available at the future timestamp. The allocations may be allocated in order for the observation thread to monitor the file loading. The allocations may be allocated in order for the server to be available for the expected file at the future timestamp.

The method may include loading the expected file into the allocated portion of memory at the future timestamp using the allocated processor cycles.

The method may also include allocating a predetermined amount of bandwidth availability to be used for loading the expected files into the memory. The bandwidth availability may be available at the future timestamp.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

FIG. 1 shows an illustrative hybrid diagram/flow chart showing multiple file observer 100. Multiple file observer 100 shows configurator 102. Configurator 102 may include a plurality of configuration details. The configuration details may be entered into configurator 102 by a sub-entity. A subset of the configuration details may remain the same for each project submitted by a sub-entity. Therefore, each sub-entity may not be required to update the subset of configuration details once the subset of configuration details are entered into configurator 102. In certain embodiments, all sub-entities of a predetermined entity may share a predetermined configuration, and therefore, only one-time entry of the subset of configuration details may be necessary.

Specific components of the configuration details, that may not be included in the subset of configuration details, may require updating and/or re-entry for each project submitted by the sub-entity.

A list of exemplary configuration details may be shown inside configurator 102. The configuration details may include an access management list. The access management list may be an inputted list of users, associated with the sub-entity, that can access the multiple file observer. The list of users may access the multiple file observer by means of a user interface and/or graphical user interface.

The configuration details may also include a master file list. The master file list may be a list of files that needs to be observed for a particular project. Because the master file list is specific to a project, the master file list may need to be updated for each additional project. The master file list may be used to validate the required files. The files received—which are the required files—may be compared to the master file list. The comparison may be done using complete file names, partial file names or keywords to validate the received files vis-a-vis the master file list. The required files may represent a group of files that are required for a specific project. Certain projects may include only required files. Other projects may include required files and optional files. In these projects, the required files may be noted as required on the master file and the optional files may be noted as optional on the master file list.

The configuration details may also include an event calendar. The event calendar may include dates and times of files to be transmitted for a specific project. Because the event calendar may include details of specific transmission times for particular projects, the event calendar may be updated for each project.

The configuration details may also include threshold limits. Threshold limits may specify requirements and associated thresholds. For example, a threshold limit may be that, for a specific project, a file, that arrives daily, may only come late five times a month. Another example may be that, a specific sub-entity may only transmit incomplete projects four times for every thirty transmitted projects. Any time a file, project or sub-entity exceeds its specified threshold limits, attention and/or corrective action may be required. Attention and/or corrective action may include altering the threshold limits, altering metadata, such as expected time of arrival, associated with the file, project or sub-entity, notifying stakeholders associated with the sub-entity, provide corrective action to the system that transmits the project or file or any other suitable attention and/or corrective action.

It should be appreciated that a threshold limit may be specific to a project or sub-entity. In the event that a threshold limit is specific to a project, the threshold limits may be adjusted or updated for each project. In the event that a threshold limit is specific to a sub-entity, the threshold limit may only be set once. There may be many threshold limits. Some of the threshold limits may be set for each project and some of the threshold limits may be set for each sub-entity.

A developer, support executive or other suitable user may enter information into a user interface (details of the user interface shown in FIG. 2), as shown at 104. The user interface may be a graphical user interface ("GUI"). The user may enter information relating to a project or file into the user interface. Entering information into the user interface may initiate the process of loading one or more files.

The user interface may include drop-down menus, entry fields and any other suitable input method. The user interface may accept information relating to project information, such as project name, project type, project sub-entity, etc. The user interface may also accept information relating to files included within a project, such as file name, file type, file size, file owner, file keywords, file wildcards, etc. The user interface may enable a user to enter multiple files within a project by using a multi-file option.

The user interface may enable a user to view the status of a file upload. The status of the file upload may include information as to whether the file was uploaded, what time the file was uploaded, whether it is in the process of being uploaded and any other suitable information.

The user interface may also enable a user to view personnel information relating to people associated with a project or file. Personnel information may include names, email addresses, telephone numbers and/or any other suitable information.

The user interface may also enable a user to input observation dates, times and durations. An observation date and time may be a time when a file or project is expected to arrive at the multiple file observer. An observation duration may be an expected length of time for loading the file or project. In some embodiments, the observation date and time may include a time frame, such as Wednesday, May 25, 2016 from 1:00 PM-2:00 PM.

The user interface may also enable a user to input location details. The location details may be details relating to the location to which a file or project may be loaded. The location information may also include sub-entity information, such as which sub-entity will be transmitting a file or project.

The user interface may also include a file frequency entry field. File frequency may relate to a project or file being inputted. File frequency may be the frequency in which the files may be loaded.

The user interface may also include "jobs to be triggered" entry field. Jobs to be triggered entry field may enable entry of jobs to be triggered upon the completion of the current project or file arrival event. Jobs to be triggered entry field may also enable entry of jobs to be triggered at a specific point in time. A job may include a file data load or project data load.

A user may also enter projects or files to be loaded using a bulk input interface, as shown at 105. The bulk input interface (described in more detail in FIG. 2) may enable a user to enter observation details using a comma separated values ("csv") files, tab separated values ("tsv") files, spreadsheets or any other suitable files.

The information inputted into the user interface or the bulk input interface is transmitted to an observation thread generator within an observation engine, as shown at 106. The observation thread generator may receive the file or project specifics entered into the user interface or bulk interface. The observation thread generator may also receive the master file list from the configurator, as shown at 107. The observation thread generator may validate the received file or project specifics against the master file list. The observation thread generator may generate a single observation thread. The single observation thread may include a multiple file observation loop. The amount of iterations included in the multiple file observation loop may be equivalent to the number files in the master file list—i.e., the number of files that may be observed.

It should be appreciated that the use of a single thread may conserve system resources. Running one thread that includes a loop as opposed to running a thread for each file may be more efficient. The process of monitoring multiple file events, triggering the required jobs and identifying a list of missing or problematic file names may be simplified when using a single thread. The single thread may also observe a file uploading event or file presence during a specified duration. A specified duration may be included for each file within the portion of the loop specific to the file.

Observation thread 108 may be executed. Observation thread 108 may instantiate a file observation instance for each file. The instantiation and execution of each file observation instance may occur within the portion of the loop designated for each file. Also, executable code may be located within the portion of the loop designated for each file. The executable code may be configured to check the location of the file, the upload duration of the file and the arrival time of the file, as shown at 110.

The observing engine may generate a status for each of the files observed, as shown at 112. The status determination may be based on the arrival time of the file as well as the upload duration of the file. The status may be success, failure or any other suitable status.

Result packager 113 may retrieve the statuses for each file. Result packager 113 may validate the observation status against the master list. Result packager 113 may prepare a status-file index. The status-file index may include each file and the status of each file.

Result packager 113 may transmit a status code to downstream systems, as shown at 116. The status code may include success, failure, waiting, error, etc. The status can be used by subsequent applications (downstream systems) for further processing.

The failed file list from the status-file index may be sent to the respective stakeholders for further action, as shown at 118. The list may include the issue items or problematic items. The failed file list may enable the stakeholders to debug the system.

Configurator 102 may transmit the threshold limits to the log analyzer, as shown at 120. The log analyzer may analyze the file observation logs with respect to the threshold limits, as shown at 122. Based on the analysis, the log analyzer may alert the respective stakeholders. The alert may include issue or problematic files.

The alert may also include statistics for a particular project. The statistics may be determined over period of time. For example, a project may include file X. The project may be reviewed each day for the arrival time of file X. After a period of two weeks, statistical calculations may be performed on the file and delivery times related thereto. The output of the statistical calculations may show that file X is arriving late for twenty percent of its arrival occurrences. Arriving late twenty percent of arrival occurrences may be five percent more than the fifteen percent threshold assigned to file X. The log analyze may transmit the determined statistics to a management, as shown at 124.

An observation details historical pattern may be transmitted from the log analyzer to the observation thread generator, as shown at 126. The intelligence and information about the file event using the historical information may be analyzed and displayed to the user aiding analysis and decisions relating to incoming files.

The observation thread generator may transmit a list of suggestions to the user, as shown at 128. The list of suggestions may include information for determining arrival times of files. Table 130 shows a list of suggestions. Table 130 may include illustrations of files, metadata relating to the files and suggestions to modify the files using the analysis information. Table 130 shows a list of suggestions for a file based on analysis of previously submitted files. Table 130 shows a probability of exemplary file AAAA being received based on activity mined from the past thirty days. Table 130 shows that there may be a ninety percent probability that file AAAA has arrived during the past thirty days. Table 130 also shows the probability of the specific file arriving during the designated future time window. The corresponding suggestion may be a fifty percent chance that file AAAA arrives during the time slot of 12 AM to 1 AM. This chance may be based on the statistical calculations of the arrival times of the past thirty days. Table 130 also shows a suggestion to increase the observation time window. The corresponding suggestions may be to increase the duration window from 12 AM to 2:30 AM in order for file AAAA to arrive with ninety five percent confidence level.

FIG. 2 shows illustrative details associated with a user interface and bulk inputs, both of which are described in FIG. 1.

Figure 3:
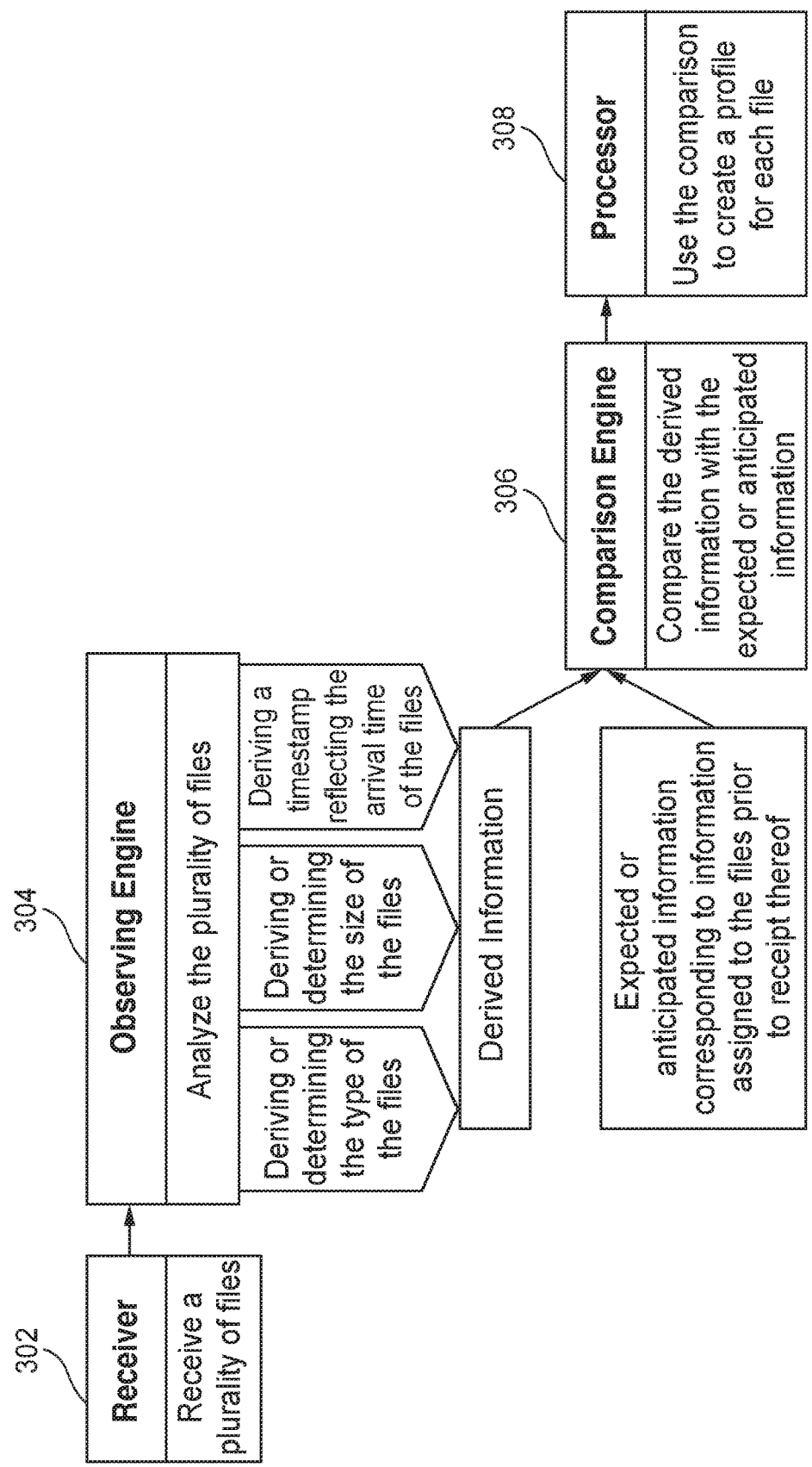
FIG. 3 shows an illustrative flow chart in accordance with principles of the invention.

FIG. 3 shows an illustrative flow chart. Receiver 302 may receive a plurality of files. Observing engine 304 may analyze the plurality of files. The analysis may include deriving or determining the type of the files. The analysis may include deriving or determining the size of the files. The analysis may include deriving a timestamp reflecting the arrival time of the files. All of the information retrieved from the analysis may form derived information. The derived information may be input into comparison engine 306. Expected or anticipated information corresponding to information assigned to the files prior to receipt thereof may also be input into comparison engine 306.

Comparison engine 306 may compare the derived information with the anticipated or expected information. The comparison engine may clarify any discrepancies between the metadata relating to the files that arrived and the metadata input by a user relating to the arrival details of the files.

Processor 308 may use the comparison information as well as any discrepancy information to create a profile for each file.

Figure 4:
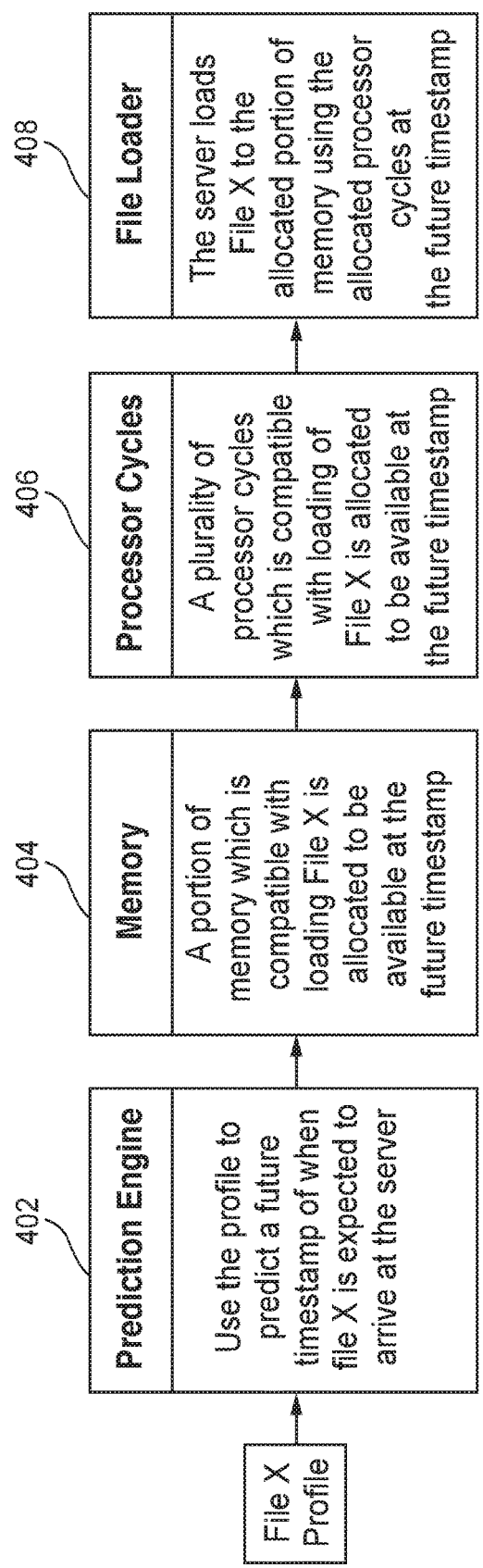
FIG. 4 shows an illustrative flow chart in accordance with principles of the invention.

FIG. 4 shows an illustrative flow chart. File X profile may be input into prediction engine 402. Prediction engine 402 may use the profile to predict a future timestamp of when file X is expected to arrive at a server. A user may input information relating to the arrival time of file X. The information may include arrival details, such as arrival time, arrival date, upload duration, etc. The system may use the profile of file X to prepare the system resources for file X.

A portion of memory 404, which is compatible with loading file X, may be allocated to be available at the future timestamp. A plurality of processor cycles 406, which is compatible with loading of file X, may be allocated to be available at the future timestamp.

The server may load file X to allocated portion of memory 404 using allocated processor cycles 408 at the future timestamp.

Thus, methods and apparatus for predictive analysis, scheduling and observation system for use with multiple file loading are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for using a multiple file observation tool to trigger data load jobs, the method comprising:
receiving a data load job at the multiple file observation tool;
receiving user input relating to the data load job, the user input comprising:

a plurality of files, each of the plurality of files included in the data load job;
a plurality of file names, each of the plurality of files names relating to a single one of the plurality of files;
an expected date of the arrival of the data load job;
an expected time slot of the arrival of the data load job;
creating a single thread to trigger the data load job, the single thread comprising multiple observation loops, each of the multiple observation loops being:
assigned to one of the plurality of files;
configured to observe its corresponding file during a specified arrival time slot assigned to the file;
configured to generate a status code upon completion of observing its corresponding file, said status code for triggering file load jobs that are dependent on the observed file;
configured to gather a list of problematic file names; and
using the gathered information to create a predictive analysis module, said predictive analysis module being configured to provide to the tool duration times for future file load jobs.

\* \* \* \* \*